United States Patent [19]
Johnson

[11] Patent Number: 5,217,549
[45] Date of Patent: Jun. 8, 1993

[54] PNEUMATIC SAFETY TIRE

[75] Inventor: David A. Johnson, Wadsworth, Ohio

[73] Assignee: Bridgestone/Firestone, Inc., Akron, Ohio

[21] Appl. No.: 680,714

[22] Filed: Apr. 4, 1991

[51] Int. Cl.$^5$ .................. B60C 17/04; B60C 17/06
[52] U.S. Cl. ................................ 152/517; 152/549; 152/555
[58] Field of Search ............. 152/516, 517, 520, 549, 152/555, 546

[56] References Cited

U.S. PATENT DOCUMENTS

| | | | |
|---|---|---|---|
| 3,542,108 | 11/1970 | Rye et al. | 152/555 X |
| 3,911,987 | 10/1975 | Takusagawa | 152/354 |
| 3,949,798 | 4/1976 | Gardner et al. | 152/330 |
| 3,954,131 | 5/1976 | Hoshino et al. | 152/354 |
| 3,983,919 | 10/1976 | Messerly | 152/555 X |
| 4,067,372 | 1/1978 | Masson | 152/354 |
| 4,067,374 | 1/1978 | Alden et al. | 152/555 X |
| 4,096,899 | 6/1978 | Kitazawa et al. | 152/555 X |
| 4,202,393 | 5/1980 | Ikeds et al. | 152/330 |
| 4,203,481 | 5/1980 | Ranik, Jr. | 152/330 |
| 4,261,405 | 4/1981 | Yamauchi et al. | 152/330 |
| 4,265,280 | 5/1981 | Kaneko et al. | 152/209 R |
| 4,287,924 | 9/1981 | Deck et al. | 152/153 |
| 4,287,929 | 9/1981 | Huinink | 152/555 X |
| 4,365,659 | 12/1982 | Yoshida et al. | 152/354 |
| 4,779,658 | 10/1988 | Kawabata et al. | 152/555 X |
| 4,917,164 | 4/1990 | Ushikubo et al. | 152/517 |
| 4,929,684 | 5/1990 | Roland et al. | 525/274 |

FOREIGN PATENT DOCUMENTS

| | | | |
|---|---|---|---|
| 0371755 | 6/1990 | European Pat. Off. | 152/555 |
| 0385192 | 9/1990 | European Pat. Off. | |
| 55-68406 | 5/1980 | Japan | 152/517 |
| 2087805 | 6/1982 | United Kingdom | 152/517 |
| 2138367 | 10/1984 | United Kingdom | |

Primary Examiner—Michael W. Ball
Assistant Examiner—Adrienne C. Johnstone
Attorney, Agent, or Firm—David A. Thomas

[57] ABSTRACT

A pneumatic safety tire, of the type preferably having a section height of five inches or greater, having a pair of crescent shaped elastomeric reinforcing members located between the innerliner and side wall and extending from adjacent the tread shoulders to at least the apex of the bead fillers of the tire. A pair of bias reinforcing plies are located between the elastomeric reinforcing members and the side walls of the tire and extend along the side walls from adjacent the tread shoulders to below the top most turn-up ends of the body ply. The elastomeric reinforcing members preferably are similar in composition to that of the bead fillers and have a low hysteresis value preferably within the range of 0.03 and 0.11, a high modulus preferably within the range of 2600 psi and 2800 psi and a Shore A hardness preferably within the range of between 85 and 91. The elastomeric reinforcing members in combination with the reinforcing bias plies, enable a high section height tire to run at high speeds for a relatively long distance in an uninflated condition, and improve the performance of heretofore low section height run flat tires.

14 Claims, 5 Drawing Sheets

PNEUMATIC SAFETY TIRE

BACKGROUND OF THE INVENTION

1. Technical Field

The invention relates to pneumatic tires and, particularly to a pneumatic safety tire, which has a wall stiffness such that when the tire is punctured during running, the tire can bear the load of the vehicle to allow for continued relatively high speeds for a relatively long distance under normal highway driving conditions until the proper repair or tire replacement can be made. Preferably, the invention relates to such a safety tire having a high profile with a section height of at least 5 inches.

2. Background Information

Various tire constructions have been devised over the years which enable a tire to run in an under-inflated or non-inflated condition such as after receiving a puncture and loss of pressurized air for extended periods of time and at relatively high speeds, to enable the vehicle operator to safely drive the vehicle to an appropriate location for repair or replacement of the punctured tire. Certain of these safety tires, referred to as "run flat tires", have been successful for certain applications and certain types of tire constructions. Most of these run flat tires achieve the run flat capability, by the placement of reinforcing layers or members of relatively stiff elastomeric material in the side walls of the tire which enable the tire to support the vehicle weight even with the complete loss of internal air pressure.

Examples of various prior art run flat tire constructions are set forth in the following patents:

U.S. Pat. No. 3,911,987 discloses a low profile motorcycle tire which has an elastomeric internal reinforcement so that the tire stays inflated for a short duration with little or no air pressure. The reinforcing layer has a Shore A hardness of at least 45, preferably outwardly of two tire body carcass plies or within the two carcass plies. This elastic reinforcement is constructed with a varying thickness cross-section so as to eliminate abrupt changes of effective hardness of the side wall and reinforcing layer.

U.S Pat. No. 3,949,798 discloses another run flat tire construction for a low profile tire having reinforcing rubber insert strips located between the inner liner and body ply carcass of the tire side wall.

U.S. Pat. No. 3,954,131 discloses a safety tire which has elastomeric internal reinforcements in the side walls to allow the tire to be used for short durations with little or no air pressure within the tire. The elastomeric side reinforcements of the FIG. 4 embodiment are of various thicknesses and are positioned outwardly of the tire carcass.

U.S. Pat. No. 4,067,372 discloses a pneumatic radial tire having internal reinforcements in its side walls which are formed of hard rubber and are used in combination with the body carcass plies and tire bead rubber inserts to give additional stiffness to the supple portions of the tire. The body carcass plies are located outwardly of the rubber inserts and are made from several cord fabric radial plies, and extend completely to the bead area of the tire.

U.S. Pat. No. 4,202,393 discloses a low profile motorcycle tire that has side wall reinforcements to allow for a run flat condition in which the reinforcements are composed of an elastic filler with a reinforcing ply position completely around the elastic filler.

U.S. Pat. No. 4,203,481 discloses a run flat tire construction having reinforcing inserts made from a high modulus, low hysteresis rubber compound, which are located inwardly of the reinforcing carcass plies of the tire.

U.S. Pat. No. 4,261,405 shows another run flat tire construction for a low profile tire having a specially constructed rubber insert mounted between the innerliner and body ply carcass in the side wall of the tire, in order to achieve the required rigidity for supporting the vehicle in an uninflated tire condition.

U.S. Pat. No. 4,265,288 discloses a pneumatic safety tire having rubber inserts mounted in the side walls thereof to provide the required run flat stiffness. The rubber inserts have a JIS hardness of not less than 70, a tensile stress less than 10 kg/cm$^2$, and an elasticity by Dunlop tripsometer of not less than 65%.

U.S. Pat. No. 4,287,924 discloses another run flat safety tire with side wall reinforcing members. These members are comprised of two components, one of which is more flexible than the other, having a hardness rating greater than 70 and the other having a hardness rating of between 80 and 95. These reinforcing members are encased in the carcass plies of the tire and have a heat conducting layer positioned between the two components of the supporting members to alleviate heating problems in the thickest portions of the supporting members.

U.S. Pat. No. 4,365,659 discloses a run flat safety tire which has side wall reinforcements made from low heat buildup rubber which are positioned between an inner protective layer and the outer carcass plies of the tire.

U.S. Pat. No. 4,917,164 discloses the use of crescent-shaped reinforcing layers in the side walls of the tire to allow the tire to run for short durations with little or no air pressure. The reinforcing layers are of varying thickness and have a Shore A hardness of between 65 and 85, and are positioned between the innerliner and carcass plies of the tire. The wall thickness of the reinforcing members is between 1 and 12 millimeters.

U.S. Pat. No. 4,929,684 discloses a pneumatic tire having greater side wall stiffness for improved handling and performance. This stiffness is achieved directly by the composition of the side walls and not by the use of separate elastomeric inserts.

U.K. Patent Application GB 2 138 367 A discloses a pneumatic tire having run flat capabilities in which an elastomeric insert having an ISO hardness not exceeding 37 and a particular thermal stability is mounted between two of the radial carcass body plies in order to provide the side wall stiffness for running in an uninflated condition.

Although many of these run flat tire constructions set forth in the above described patents, have proved to be successful for certain applications, all of these construtions pertain to low profile tires, that is a tire having a section height less than 5 inches and are of the type usually found on high performance vehicles or motorcycles, to which the above referenced patents pertain, and rely almost entirely on the stiffness of the elastomeric insert to provide the support for the uninflated tire. Furthermore, these high performance tires and motorcycle tires carry relatively smaller loads when compared to the higher weights carried by the larger cars using the higher section height tires.

Heretofore, the providing of a run flat tire for a high profile tire construction, that is a tire having a section height of 5 inches or greater, has not proved successful due to the relatively large side wall reinforcement members which would be required to adequately support the tire in an uninflated condition to enable the tire to run for a relatively long distance at a relatively high rate of speed. The relatively large rubber inserts which would be required would increase the weight of the tire to an unacceptable limit and would materially detract from the ride characteristic of the tire. If the amount of the material or type of material in these relatively large side wall inserts were reduced or changed in order to lessen the weight of the tire and improve the ride characteristics for high section height tires, excessive heat would be generated within the inserts during a run flat condition due to the increased tire deformation, resulting in the rapid destruction of the tire, thus preventing the desired run flat capabilities from being achieved at usual highway speeds for satisfactory use on such tires on most passenger vehicles.

Thus, the need has existed for a pneumatic safety tire or run flat tire, preferably for high profile tires, that is a tire having a section height of 5 inches or greater, which heretofore has not been achieved by the use of the various constructions and technology presently used for the construction of run flat tires having a low profile, and to such a safety tire in which the required side wall stiffness is achieved by a combination elastomeric insert and a reinforcing bias ply strip which also improves the low profile run flat tire construction.

SUMMARY OF THE INVENTION

Objectives of the invention include providing an improved safety tire construction which enables the tire to achieve satisfactory run flat capabilities, so that the speed of the vehicle can be maintained for relatively long distances at relatively high speeds, such as for 100 miles at 50 mph, for example, without seriously affecting the ride characteristic and safety of the vehicle.

A further objective of the invention is to provide such a pneumatic safety tire in which the tire has a high profile, that is a section height of 5 inches or greater, and which does not significantly affect the weight of the tire and the ride characteristics thereof.

A still further objective of the invention is to provide such a pneumatic safety tire which can be constructed by usual manufacturing techniques, requiring few additional manufacturing steps and procedures, thereby minimizing the increased cost of the tire, while still achieving the desired run flat capability.

Another objective of the invention is to provide such a pneumatic safety tire which, in addition to being able to run at a relatively high highway speeds for extended distances, can also withstand various cornering forces and longitudinal forces due to acceleration and braking which the tire may experience during the run flat tire condition, without reducing the effectiveness and safety of the tire.

A further objective of the invention is to provide such an improved pneumatic safety tire utilizing elastomeric reinforcing segments located in the side wall of the tire, which segments are formed of a compound having a high modulus, low hysteresis and sufficient stiffness or hardness, in order for the tire to achieve the desired reinforcing effect required to support the vehicle in a run flat condition, without excessively increasing the weight of the tire, and which prevents overheating of the tire and subsequent destruction thereof in a high section tire, heretofore not possible in known, low profile run flat tire constructions.

Still another objective of the invention is to provide such an improved pneumatic safety tire in which a reinforcing strip of bias cord material is mounted between the side walls of the tire and the reinforcing elastomeric members, preferably in contact with the carcass body ply of the side wall, which strip extends along the tire side wall from beneath the reinforcing belts in the tire tread area to beyond the turn-up ends of the body plies, and which in combination with the elastomeric reinforcing members enables the tires to achieve the desired run flat tire capability.

These objectives and advantages are obtained by the improved pneumatic safety tire construction of the present invention, the general nature of which may be stated as being of the type having a tread, a pair of side walls, a pair of beads located below the side walls, a pair of bead fillers, a body ply having turn-up ends, and an innerliner, wherein said improvement includes a pair of generally crescent-shaped elastomeric reinforcing members secured between the innerliner and the body ply and extending from the tread to at least the bead fillers; and a pair of reinforcing plies located between the elastomeric reinforcing members and side walls and extending from the tread a substantial distance along the sidewalls to at least the turn-up ends of the body ply.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
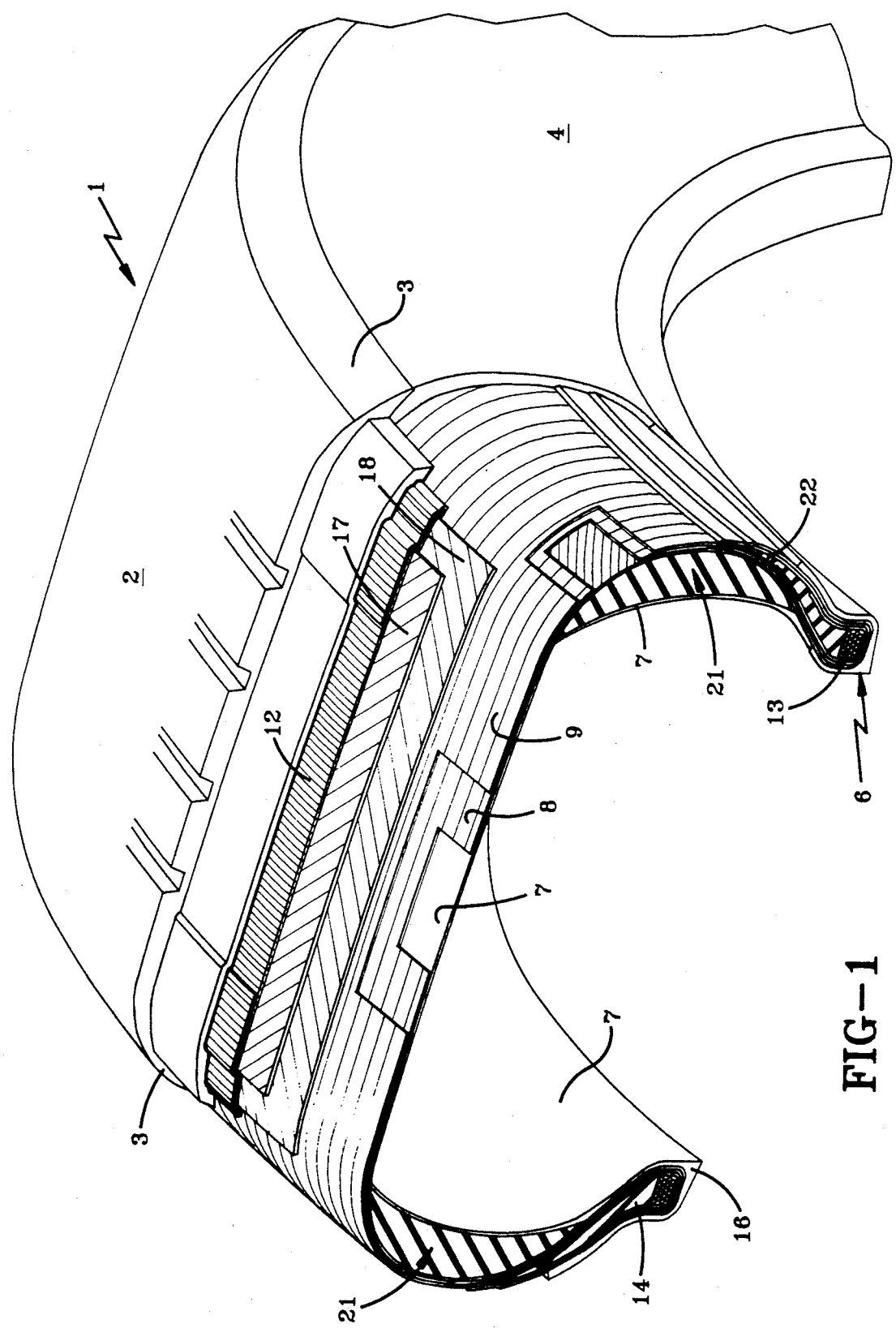
FIG. 1 is a fragmentary perspective view with portions broken away showing the improved run flat safety tire of the invention.
Figure 2:
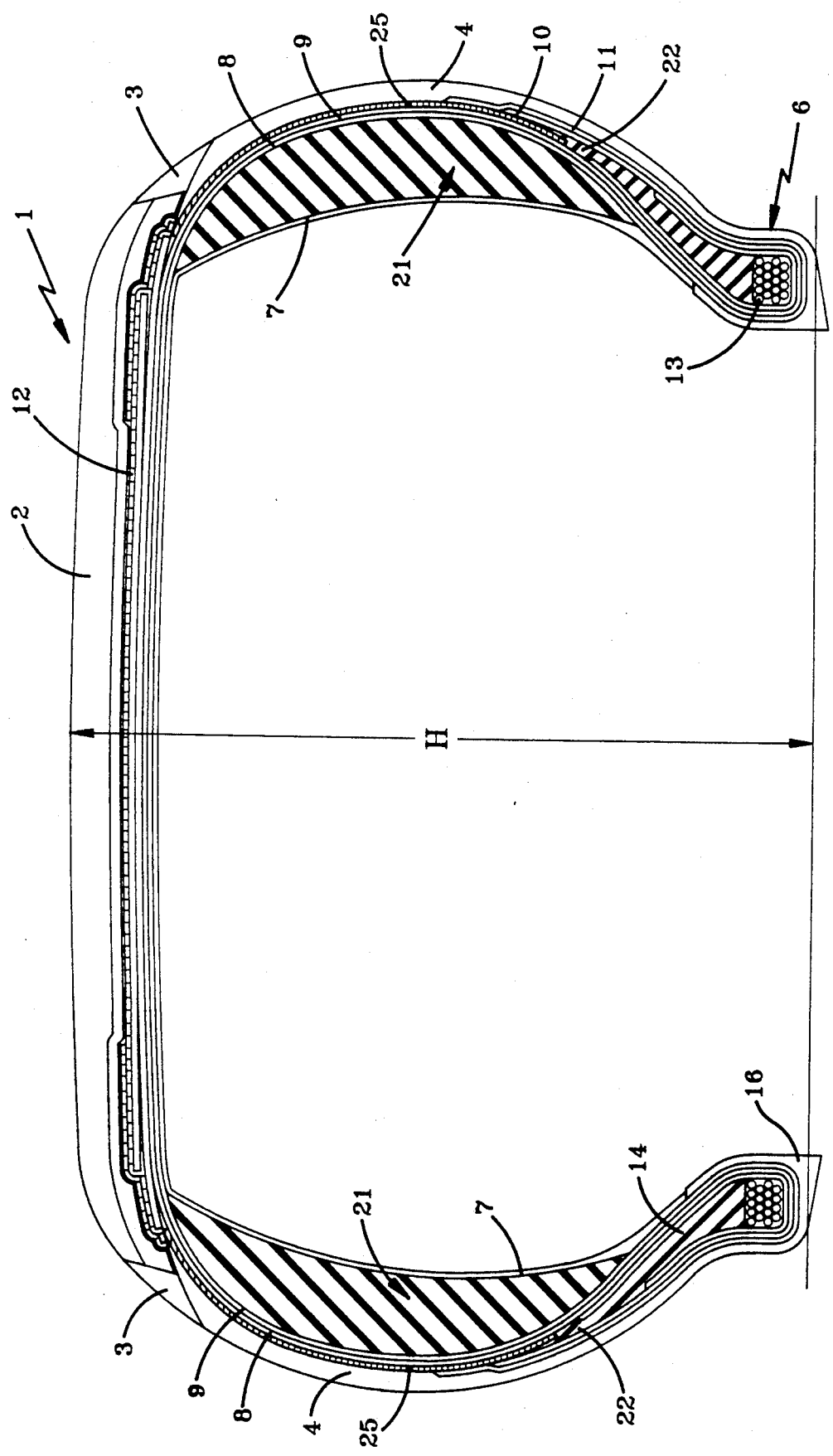
FIG. 2 is a vertical sectional view of the improved tire construction of FIG. 1.

The improved safety tire of the invention is indicated generally at 1, and is best shown in FIGS. 1 and 2. Tire 1 includes a tread portion 2 terminating in a pair of tread shoulders 3 adjacent a pair of side walls 4, which extend radially from the axial outer shoulders 3 to a pair of bead portions, indicated generally at 6. As in a typical pneumatic tire, the interior of the tire includes an innerliner 7 formed of a high air impervious material, in combination with one or more body plies 8 and 9, which form the carcass of the tire. Body plies 8 and 9 extend around bead portions 6 and terminate in turn-up ends 10 and 11 respectively, and are usually calendered with a thin coating of rubber. Each bead portion 6 consists of a known annular bead wire 13 and a generally triangular-shaped bead filler 14. Abrasive gum strips 16 preferably are assembled with the finished tire and are adapted to be located adjacent each flange of a wheel rim on which the tire is to be mounted.

Usual reinforcing tread ply belts of wire 12 and/or bias fabric strips 17 and 18 are located between body carcass plies 8 and 9 and read portion 2. These tire components are all contained within integrally formed inner and outer rubber casings, portions of which form the side walls of the tire. The tire section height is indicated at "H", and in accordance with one of the features of the invention, has a height of at least 5 inches or greater, and is referred throughout as a high profile tire. In passenger tire nomenclature, such as P 225/60 R 16, 225 represents in millimeter the section width of the tire, 16 represents in inches the wheel diameter, and 60 the ratio in percentage of the tire section height with respect to the section width.

The previously described tire construction may vary without affecting the concept of the invention, and is illustrative of a general pneumatic tire construction into which the various improvements described hereinafter are incorporated to form the improved safety tire of the present invention.

Figure 3:
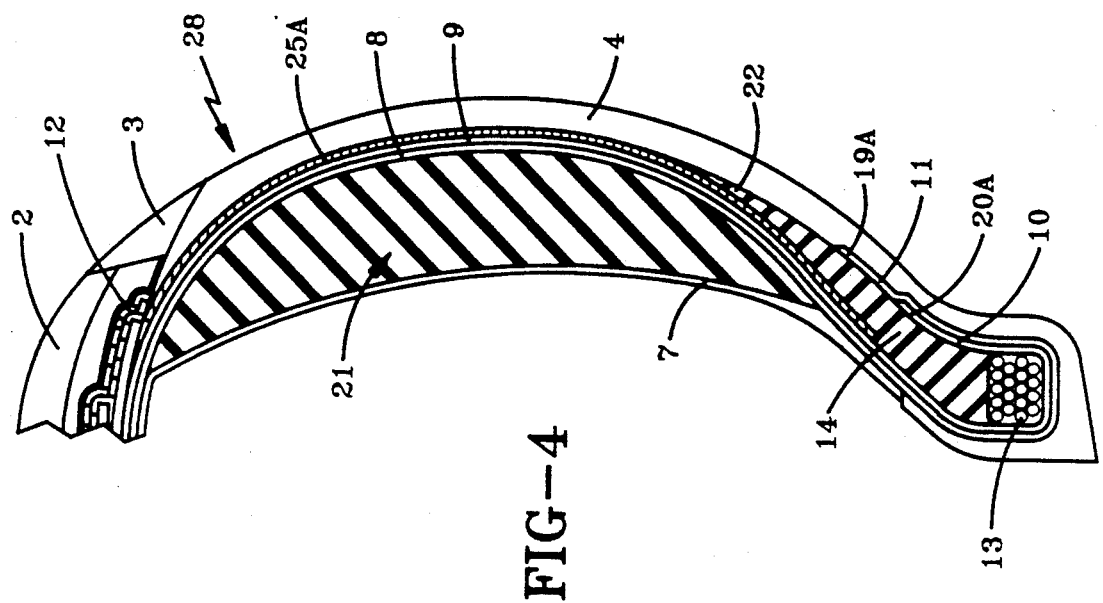
FIG. 3 is an enlarged fragmentary sectional view of one side of the improved safety tire of the type shown in FIG. 2 and having high turn-up ends, with the reinforcing bias ply being located outwardly of the body plies.
Figure 4:
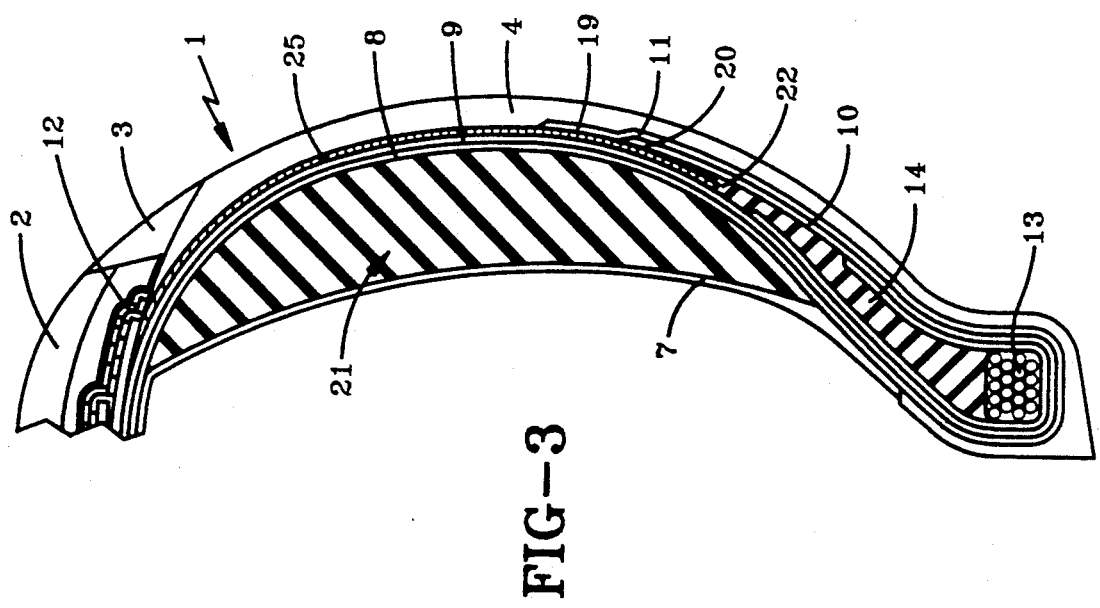
FIG. 4 is a sectional view similar to FIG. 3 but with the body plies having low turn-up ends.

In accordance with the invention, a pair of generally crescent-shaped elastomeric reinforcing members indicated at 21, are mounted between innerliner 7 and body plies 8 and 9 and extend from adjacent tread shoulders 3 of tread portion 2 along the side wall of the tire to a position generally adjacent and slightly below the apex 22 of bead filler 14. In further accordance with the invention, a pair of bias reinforcing strips or plies 25, in a first embodiment as shown particularly in FIGS. 2-4, is located between side walls 4 and body carcass plies 8 and 9, with plies 25 extending along the side wall of the tire to a position below apex 22 of bead filler 14. FIG. 3 shows a tire having generally high turn-up body ply ends 19 and 20 of body plies 8 and 9, respectively.

As shown in FIG. 3, biased reinforcing strip 25 extends from beneath at least one of the tread reinforcing belts, such as belt 12, to below at least the highest turn-up end 19 of body ply 8. If desired, strip 25 could extend from further beneath the tread reinforcing strips and further beyond both turn-up ends without effecting the concept of the invention. So long as strip 25 extends between the outward end of one of the tread belts and beyond the highest turn-up end of one of the body plies, it will be tied in sufficiently with the remaining tire components to provide the desired advantages of the invention.

Preferably strips 25 are in contact with body ply 9, generally throughout the length of strips 25. This contact and resulting interaction between the calendered cord materials of strips 25 and body ply 9 provides an increased stiffness in the side wall due to the sheer loading therebetween when the tire is in the run flat condition. With this arrangement, tension begins almost immediately in reinforcing strips 25 in the preferred embodiment described above, upon the tire becoming deflated.

FIG. 4 shows a modified embodiment 28 wherein the bias ply strip, indicated as 25A, is mounted in a tire side wall where body plies 8 and 9 have low turn-up ends 19A and 20A. In this construction, strip 25 will extend further along side wall 4 then in embodiment 1 in FIG. 3, until it extends beyond the topmost turn-up end 19A in order to tie strip 25A into the rest of the tire components. Again, strip 25A is in contact throughout its entire length with body ply 9 to achieve the desired increased stiffness not believed achieved by prior run flat tire constructions.

Strips 25 are formed of a known body ply or carcass material, that is, it contains uniformly arranged reinforcing cords encased within an elastomeric material. Strip 25 in the preferred embodiment, has an EPI of 22 ends per inch and is formed of nylon 66 with a denier of 840/2 and will be calendered to provide a thin rubber coating over the strands as with body plies 8 and 9. The cords also can be formed of polyester or other synthetic fibers, or may be steel or the like, without effecting the concept of the invention. The cords preferably are biased between $-60°$ and $60°$, in reference to the direction of the cords in body carcass plies 8 and 9.

In accordance with another feature of the invention, the compound from which the elastomeric reinforcing members 21 are formed, preferably has a high modulus, a low hysteresis, and a particular durometer Shore A hardness range. It has been determined that a modulus of between 1800 psi and 4000 psi would be suitable, the preferred range being between 2600 psi and 2800 psi, with the modulus of the preferred embodiment being approximately 2700 psi. These modulii are at the run flat operating condition and are measured at approximately 15% strain range. It has furthermore been found that the hardness range should be between 80 and 97, the preferred range being between 85 and 91, with the hardness of the preferred embodiment being 88 on the Shore A hardness scale. Likewise, the hysteresis when measured at 212° F. at 10 Hertz, has a Tangent Delta of between 0.03 and 0.20, with the preferred range falling between 0.03 and 0.11. However, this Tangent Delta value preferably is between 0.03 and 0.07, which is believed to provide the most satisfactory results when combined with the particular modulus and hardness range previously discussed.

One example of a compound which provides these characteristics would be comprised of between about 0 and 65 parts by weight of polyisoprene; between 25 and 35 parts by weight of a high styrene resin, SRR (Styrene Butadiene Rubber) masterbatch and from about 0 to 65 parts by weight of polybutadiene to total 100 parts by weight; between about 50 and 60 parts by weight of a reinforcing filler, per 100 parts of rubber, and at least about 5 parts by weight of sulfur, per 100 parts of rubber. Such a compound is further defined and set forth in copending application Ser. No. 07/680,497, Filed Apr. 4, 1991 filed by the Assignee of the present invention concurrently herewith, and which is incorporated herein by reference in the interest of full disclosure.

The formation of reinforcing members 21 having the characteristics discussed above, has been found to provide the most satisfactory results and most efficient run flat tire to date, which provides the desired run flat capabilities without excessively increasing the weight of the tire and without materially affecting the ride characteristic achieved thereby when in a normal inflated operating condition. Furthermore, it has been found that bead filler 14 preferably is formed of a compound having the same range of characteristics as that previously described for side wall reinforcing members 21.

Figure 5:
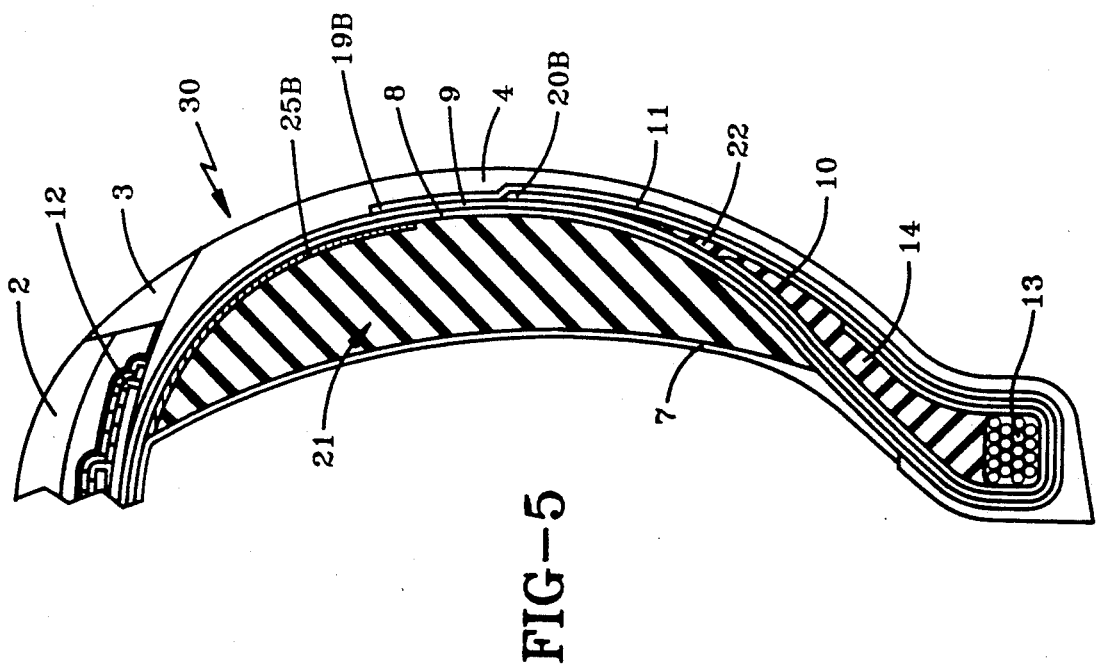
FIG. 5 is a sectional view similar to FIG. 3 but with the reinforcing bias ply being located on the inside of the side wall body ply and with the tire having high turn-up body ply ends.

Another modified form of the invention is indicated generally at 30, and is shown in FIG. 5. Embodiment 30 is similar to the previously described safety tires of embodiment 1 and 28 of FIGS. 3 and 4, respectively, with the exception that bias reinforcing strips 25B are located between elastomeric reinforcing members 21 and innermost body ply 8, in contrast to being located outwardly of body plies 8 and 9. Reinforcing strip 25B is shown in FIG. 5 wherein body plies 8 and 9 have relatively high turn-up ends 19B and 20B, respectively. In this construction, biased reinforcing strip 25B will have a relatively short length, sufficient only to extend from beneath the outermost end of tread belt 12 and below top most turn-up end 19B. However, if desired, strip 25B could extend further along side wall 4, although any further advantage possibly achieved would most likely be negated by the increased weight. As previously described, strips 25B preferably will be in contact with body ply 8.

Figure 6:
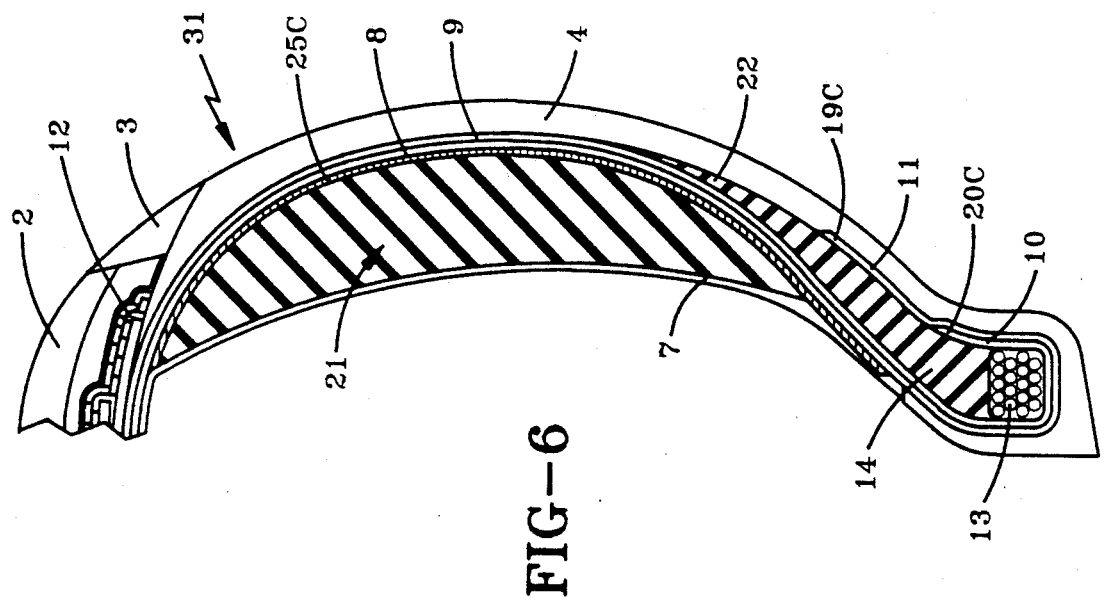
FIG. 6 is a sectional view similar to FIG. 5 but with the body plies having low turn-up ends.

FIG. 6 shows another embodiment indicated at 31, generally similar to that of embodiment 30, wherein bias strip 25C is located between body ply 8 and elastomeric strip 21, in contact with ply 8. However, FIG. 6 shows a low body ply turn-up construction wherein turn-up end 19C and 20C extend for only a short distance along bead filler 14 requiring a longer length for bias ply strip 25C in order to extend below uppermost turn-up end 19C.

It is believed that the preferred construction relative to the placement of reinforcing strips 25 and 25A, is outside of body plies 8 and 9 as shown in FIGS. 2-4, although for certain applications it may be more desirable to locate the reinforcing strips between elastomeric reinforcing members 21 and body plies 8 and 9 as shown in FIGS. 5 and 6. However, both constructions will achieve the advantages of the invention as noted previously, especially by maintaining contact of the reinforcing strips with the adjacent body ply. As previously indicated, the body plies and reinforcing strips preferably are coated with a thin covering of rubber or similar material.

It has been determined that the particular combination of features previously described, and in particular the formation of elastomeric reinforcing members 21 of the described low hysteresis material so as to provide proper heat dissipation, and of the high modulus and durometer hardness to achieve the stiffness and strength required, in combination with the use of the reinforcing bias ply strips 25, provides an improved run flat tire construction for both a low section height tire and enables a run flat tire construction to be achieved also for a high section height tire. These tires are able to withstand the high circumferential strain force component exerted on the tire, and especially those forces exerted on high section height tires, not possible with prior art run flat tire constructions. Furthermore, the resulting tire of the invention can be produced by known manufacturing methods by incorporating into the manufacture, the additional steps of applying the elastomeric reinforcing members and reinforcing bias strips during the buildup of the tire on a known tire building drum, either manually or automatically. This eliminates additional, expensive manufacturing equipment, and most importantly, provides a safety tire with a relatively small increase in weight and without appreciably affecting the ride characteristic of the vehicle during usual inflated tire operation.

Although it may be possible with prior art technology to provide sufficient side wall reinforcement and stiffness to provide a run flat tire for a high section height tire of five inches or greater, the resulting weight of the tire would be excessive and would provide an unsatisfactory ride making it unsuitable for usual vehicle tire usage. However, the present invention achieves the desired results by utilizing the particular elastomeric reinforcing members 21, in combination with reinforcing bias strips 25 as previously described. Likewise, the use of reinforcing strips 25 extending from beneath the outermost end of a tread reinforcing belt to below the top most turn-up end of a body ply, preferably in contact with the adjacent body ply, enables improved results to be obtained for low section height tires.

As shown in the drawings, one end of elastomeric reinforcing members 21 and of reinforcing strips 25 will be located inwardly and beneath the outermost end of a tread reinforcing belt, with the opposite end of reinforcing members 21 being adjacent to and preferably extending slightly below apex 22 of bead filler 14. This arrangement, in essence, ties reinforcing members 21 between the tread and bead fillers and bias strips 25 between the tread and the body ply or plies.

Figure 7:
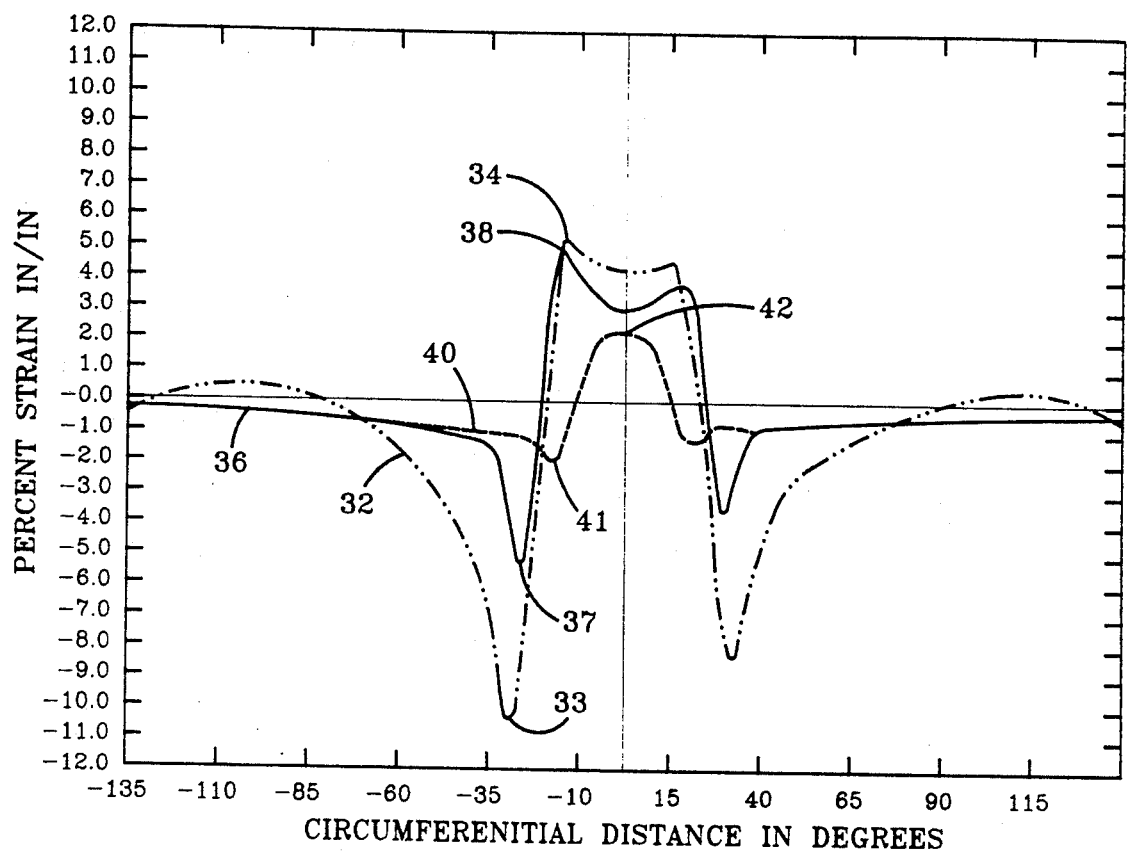
FIG. 7 is a graph comparing the improved safety tire of the invention with two other safety run flat tire constructions.
Figure 8:
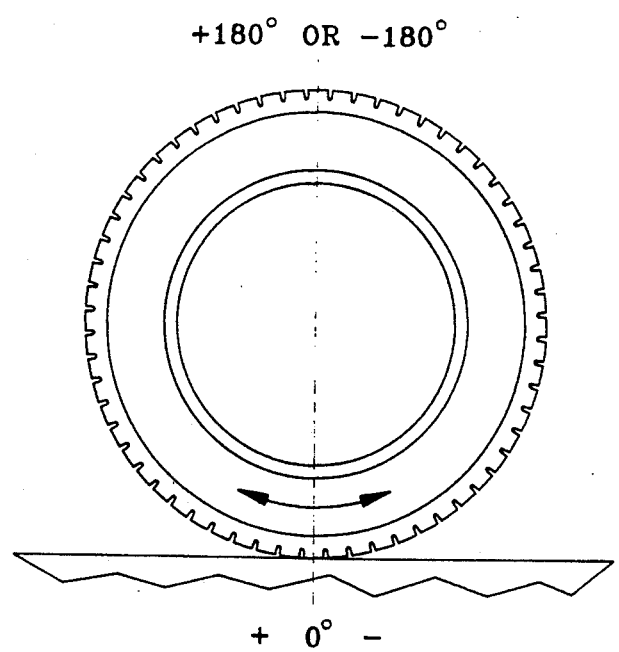
FIG. 8 is a diagrammatic view of a tire showing the points of reference for the strain curve components shown in FIG. 7.

FIG. 7 graphically discloses the results achieved by the improved safety tire in comparison with two other run flat safety tire constructions using finite element predictions with the reference points being taken with respect to the footprints of a tire as shown in FIG. 8. Dot dash line 32 represents the run flat tire results of a high profile tire having a section height greater than 5 inches, with only elastomeric reinforcing members mounted in the side walls thereof, without the use of reinforcing strips 25. As illustrated, a considerable circumferential strain difference exists as the tire rotates which is indicated by the steep slope extending between points 33 and 34. Such a large circumferential strain will result in excessive heat buildup of the tire and early destruction thereof.

Solid line 36 represents a run flat tire construction having a low section height or low profile, that is, having a section height of less than five inches, containing elastomeric reinforcing members 21 without the reinforcing strips 25. As illustrated, the strain component which occurs at a particular point on the tire during each revolution, shown by the slope of the line extending between points 37 and 38, is considerably less than that occurring in the high section height tire represented by dot dash line 32, and provides an improved run flat tire construction which may be suitable for certain applications. However, as illustrated via lines 32 and 36, by retaining the same characteristics of the elastomeric reinforcing members 21 and the basic tire construction, a considerably greater circumferential strain component is placed on the high profile tire than on a low profile tire, which will result in the relatively rapid overheating and subsequent destruction of the high profile tire represented by line 32.

Dash line 40 represents the strain distribution component imparted on the tire of the present invention, which is a high profile tire, similar to that represented by line 32, but utilizing the particular compound elastomeric material previously described for formation of reinforcing members 21, in combination with the use of reinforcing strips 25. As illustrated, the circumferential strain component represented by the line slope extending between points 41 and 42, is less than that experienced by the low profile tire represented by line 36, and is considerably less than that experienced by the high profile tire without strip 25, represented by line 32.

In addition to the circumferential strain finite element predictions of the three above described tires, additional road tests were performed on various run flat tire constructions under road conditions to determine the effectiveness and results achieved by the improved tire construction of the invention, and to insure that the desired results were achieved in actual operation.

In particular, two groups of 225/60R16 size tires were tested, each having a front position axle load of 2400 pounds and a rear position axle load of 2000 pounds. Run flat tests were conducted with 100 feet long, 12 feet wide aggressive lane changes every five miles, with the lane changes having peak lateral G forces of between 0.6 and 0.75, and at a speed of 50 mph. The first group of tires tested was of the prior run flat tire construction, wherein they had only elastomeric reinforcing members incorporated into the side walls. The front tires of this first group failed after 80 miles of road test and the rear tires failed after only 30 miles of this run flat road test.

Next the second group of tires were of the same construction as the first group but contained the pair of bias reinforcing strips 25 in the side wall, in the manner shown in FIGS. 2-4 and discussed above. This second group of tires were removed after 100 miles of the run flat road test and were still functional. None of the front or rear tires of this second group was removed due to failure after the 100 road test miles. Thus, the test showed the improved results that were obtained in the tire of the present invention by incorporating the reinforcing strips 25 in the side walls as described above.

Accordingly, the improved safety tire construction of the invention provides a run flat tire for high profile pneumatic tires, which tires are able to run for relatively long distances and at relatively high speeds, at a run flat or uninflated condition, wherein the tire is constructed by known manufacturing procedures at a relatively small increase in material and manufacturing costs, and provides a tire construction which does not materially affect the overall weight and ride characteristics during normal operation of the tire, and in which such results were not able to be achieved by using the teachings of prior art run flat tire constructions heretofore used principally on low profile pneumatic tires having a section height of less than 5 inches.

Accordingly, the improved pneumatic safety tire of the invention is simplified, provides an effective, safe, inexpensive, and efficient tire which achieves all the enumerated objectives, provides for eliminating difficulties encountered with prior tires, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pneumatic safety tire is constructed and used, the characteristics of the construction, and the advantageous, new and useful results obtained; the new and useful structures, devices, elements, arrangements, parts and combinations, are set forth in the appended claims.

I claim:

1. A pneumatic run flat tire of the type having a tread terminating in a pair of shoulders, a pair of side walls, a pair of beads located below the side walls, a pair of bead fillers, at least one body ply having radially oriented reinforcing cords and having turn-up ends extending along the side walls, and an innerliner, including:

a pair of generally crescent shaped elastomeric reinforcing members secured between the innerliner and the body ply and extending from the tread to at least the bead fillers, which members are substantially capable of supporting the tire in a run flat condition; and a reinforcing ply containing a plurality of generally parallel reinforcing cords coated with rubber located between each of the elastomeric reinforcing members and side walls, the reinforcing cords oriented at a bias with respect to the radially oriented ends of the body ply and terminating at one end inwardly of a respective one of the tread shoulders and extending therefrom a substantial distance along the side walls to at least the turn-up ends of the body ply and in generally continuous contact with said body ply along the reinforcing member.

2. The tire construction defined in claim 1 in which the reinforcing plies are located between the side walls and body ply.

3. The tire construction defined in claim 1 in which the reinforcing plies are located between the body plies and the elastomeric reinforcing members.

4. The tire construction defined in claim 1 in which the elastomeric reinforcing members terminate inwardly of the tread shoulders.

5. The tire construction defined in claim 1 in which the cords of the reinforcing plies are at a bias between −60° and 60° with respect to the body ply cords.

6. The tire construction defined in claim 1 which the elastomeric reinforcing members are formed of the same compound as are the bead fillers.

7. The tire construction defined in claim 1 in which the elastomeric reinforcing members have a hysteresis value within the range of 0.03 and 0.20 Tangent Delta at 212° F. and 10 Hz.

8. The tire construction defined in claim 1 in which the elastomeric reinforcing members have a hysteresis value within the range of 0.03 and 0.11 Tangent Delta at 212° F. and 10 Hz.

9. The tire construction defined in claim 1 in which the elastomeric reinforcing members have durometer hardness of between 80 and 97 on the Shore A hardness scale.

10. The tire construction defined in claim 1 which the elastomeric reinforcing members have a durometer hardness of between 85 and 91 on the Shore A hardness scale.

11. The tire construction defined in claim 1 in which the elastomeric reinforcing members have a modulus within the range of 1800 psi and 4000 psi measured at a run flat condition at approximately the 15% strain range.

12. The tire construction defined in claim 1 in which the elastomeric reinforcing members have a modulus within the range of 2600 psi and 2800 psi measured at a run flat condition at approximately the 15% strain range.

13. The tire construction defined in claim 1 in which the tire is a high profile tire having a section height of five inches or greater.

14. The tire construction defined in claim 1 in which the tire is a low profile tire having a section height of below five inches.

* * * * *